US006647698B1

(12) United States Patent  (10) Patent No.: US 6,647,698 B1
Rijken  (45) Date of Patent: Nov. 18, 2003

(54) SYSTEM AND METHOD FOR CONVEYING SHEET-LIKE OBJECTS

(75) Inventor: Jacobus Rijken, Vaassen (NL)

(73) Assignee: Ergoflow B.V., Apeldoorn (NL)

( * ) Notice: Subject to any disclaimer, the term of this patent is extended or adjusted under 35 U.S.C. 154(b) by 0 days.

(21) Appl. No.: 09/889,008
(22) PCT Filed: Jan. 5, 2000
(86) PCT No.: PCT/NL00/00008
§ 371 (c)(1), (2), (4) Date: Jul. 5, 2001
(87) PCT Pub. No.: WO00/40490
PCT Pub. Date: Jul. 13, 2000

(30) Foreign Application Priority Data

Jan. 6, 1999 (NL) .............................. 1010969

(51) Int. Cl.[7] .............................. B65B 11/48; B65B 6/20
(52) U.S. Cl. .............................. 53/460; 53/284.3; 53/493
(58) Field of Search .............................. 53/460, 284.3, 53/493

(56) References Cited

U.S. PATENT DOCUMENTS

| 1,951,820 A | * | 3/1934 | Emerson | |
| 2,792,997 A | | 5/1957 | Affelder | 243/34 |
| 3,192,845 A | | 7/1965 | Schmidt | 95/89 |
| 3,849,968 A | * | 11/1974 | Tateisi | |
| 3,888,433 A | | 6/1975 | Fish | 243/1 |
| 4,113,247 A | | 9/1978 | Philips | 271/264 |
| 4,437,612 A | | 3/1984 | Russ et al. | 239/556 |
| 5,634,636 A | | 6/1997 | Jackson et al. | 271/225 |
| 5,836,247 A | | 11/1998 | Stephen et al. | 101/420 |

FOREIGN PATENT DOCUMENTS

| EP | 0 092 974 A | 11/1983 |
| EP | 0 690 423 A2 | 1/1996 |
| JP | 60-232371 | * 11/1985 |

* cited by examiner

Primary Examiner—M. D. Patterson
(74) Attorney, Agent, or Firm—Steven M. Koehler, Esq.; Westman, Champlin & Kelly, P.A.

(57) ABSTRACT

A system for conveying sheet-like objects, in particular banknotes, comprises a cash dispensing unit, a number of cash dispensing stations and a control unit. A conveying channel having an inlet side and an outlet side is disposed between the cash dispensing unit and each cash dispensing station, with elements for generating an air flow being present in each conveying channel. An enveloping device for enveloping the objects to be conveyed is disposed between the cash dispensing unit and the conveying channel(s). The cash dispensing unit delivers banknotes requested by a cash dispensing station to the enveloping device under the control of the control unit, which enveloping device envelopes the banknotes by a cash dispensing station and delivers the envelope to a unit for delivering the envelope containing banknotes to a conveying channel.

10 Claims, 5 Drawing Sheets

SYSTEM AND METHOD FOR CONVEYING SHEET-LIKE OBJECTS

CROSS-REFERENCE TO RELATED APPLICATION

This application is a national state filing of and claims priority from International Application No. PCT/NL00/00008 filed on Jan. 5, 2000 for "SYSTEM AND METHOD FOR CONVEYING SHEET-LIKE OBJECTS", which was published in English.

BACKGROUND OF THE INVENTION

The invention relates to a system for conveying sheet-like objects by air through a channel and a method for the same.

Systems and methods of this kind are known in several embodiments, see for example EP-A-0 690 423. In the prior art conveying systems, which are usually referred to as pneumatic conveyor systems, the sheet-like objects to be conveyed are put into a so-called cartridge, in which they are transported through the conveying channel. Although the objects can thus be transported in a reliable manner by the conveying system, the use of cartridges has several drawbacks. In the case of automated systems, for example, relatively complex installations are needed for putting the sheet-like objects into a cartridge. Furthermore the speed at which a cartridge moves through the conveying channel is relatively low. In addition, return transport is necessary at all times in order to return the cartridges to the starting point.

SUMMARY OF THE INVENTION

The object of the invention is to provide a system and method of the kind referred to in the introduction, wherein the use of cartridges can be avoided.

Thus a system and a method are obtained wherein the objects no longer need to be put into a cartridge and the enveloped objects are directly delivered to the conveying channel, floating freely, as it were, through the conveying channel towards the outlet side. This makes the system as disclosed herein very user-friendly. Return transport of empty cartridges is not necessary. The velocity at which the envelopes are transported is very high, so that the system has a high capacity. The transport of cash within a bank building can be automated practically completely, with the additional advantage that no cash needs to be present at the cash dispensing stations. This provides a considerable improvement with regards to security. It is noted that the term "cash dispensing stations" is understood to include a cashier/teller station at the counter as well as an automatic cash dispensing machine.

BRIEF DESCRIPTION OF DRAWINGS

The invention will now be explained in more detail with reference to the drawing, which includes.

BRIEF DESCRIPTION OF ILLUSTRATIVE EMBODIMENTS

Figure 1:
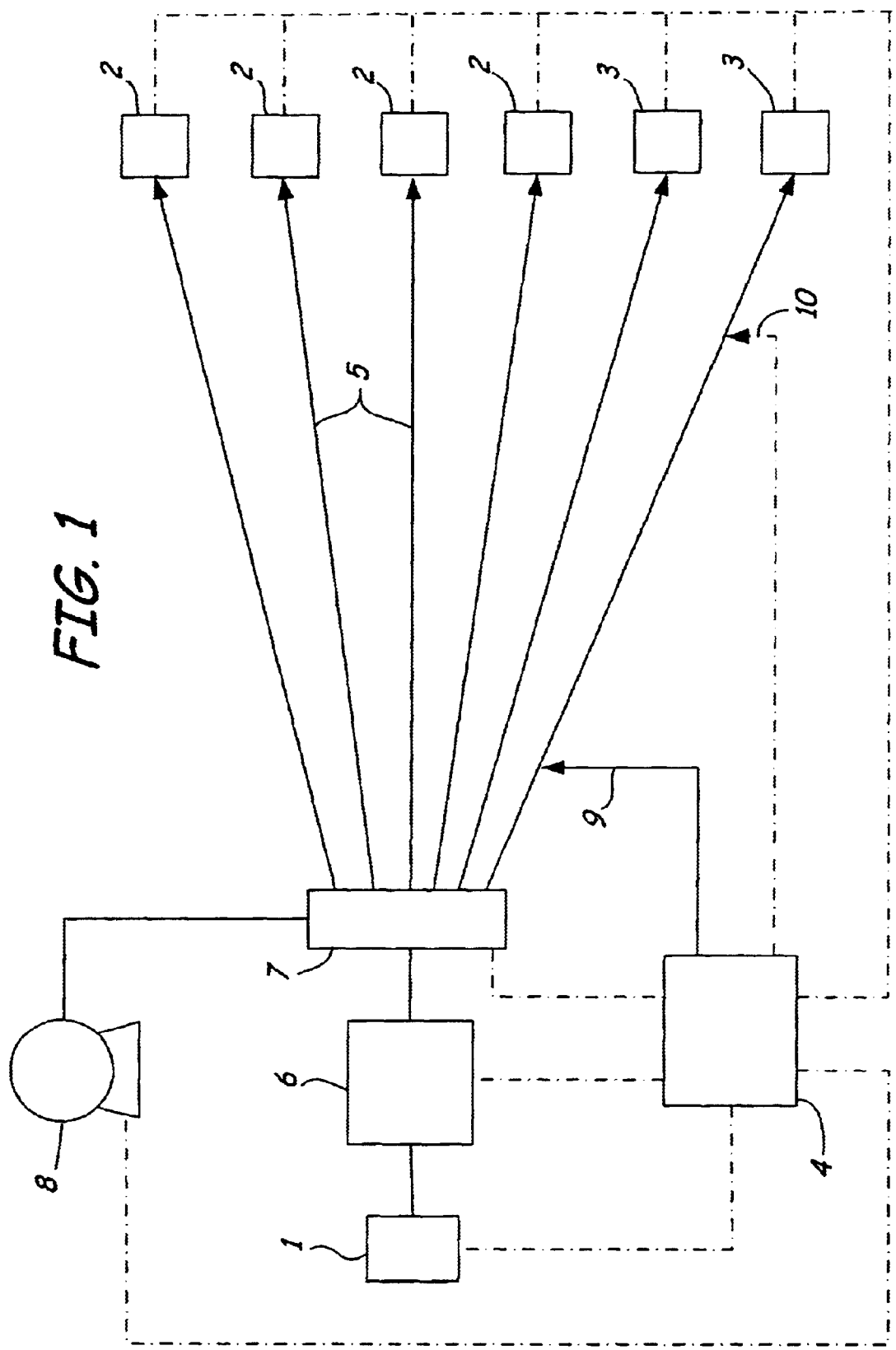
FIG. 1 is a block diagram of a system for conveying banknotes.

The system as shown comprises dispensing unit 1 or cash dispenser, a number of cash dispensing stations 2, 3 and a control unit 4. The cash dispensing stations 2 are cashier/teller stations at a counter in a bank building, while the cash dispensing stations 3 are automatic cash dispensing machines. A conveying channel 5 indicated by a line is disposed between each cash dispensing station 2, 3 and the cash dispensing unit 1, which channel functions to transport banknotes (not shown) from the cash dispensing unit 1 to a cash dispensing station 2 which has sent a request for cash to unit 1.

Disposed between the cash dispensing unit 1 and the inlet side of the conveying channels are an enveloping device 6 and a selecting unit 7.

When a cash dispensing station 2, 3 makes a request for an amount in banknotes in the system disclosed herein, the control unit 4 signals this to the cash dispensing unit 1, which delivers the requested amount in the requested form to the enveloping device 6. The enveloping device 6 envelopes the banknotes and subsequently delivers the envelopes to the selecting unit 7. The selecting unit 7 is so controlled by the control unit 4 such that the envelope containing the banknotes is delivered to the conveying channel 5, which is connected to the cash dispensing station 2, 3. Connected to conveying channels 5 is a pump 8 (schematically indicated), which generates an air flow in the conveying channel 5, so that the envelope is transported, floating or sliding freely in the channel, to the cash dispensing station 2,3 that has issued the request. The envelope is delivered at the cash dispensing station in question, where the envelope can be removed automatically, if desired.

It is noted that the envelope enables the user of the system to supply the customer with current general information, personal information or commercial information and the like.

The conveying channels 5 can be arranged in various ways. Possible embodiments of the conveying channels are disclosed in the applicant's Dutch patent application No. 1010748, which is considered to be incorporated herein by reference. The use of such channels is conducive to the freely floating or sliding movement of the envelopes containing banknotes.

According to an advantageous embodiment, in order to improve the transport of the envelopes through the conveying channels 5, the enveloping device 6 may be so arranged that the envelopes, which are generally substantially rectangular, comprise a folded-back portion at a short end edge on at least one side. Said folded-back portion forms a semi-arrow with a principal plane of the envelope, as it were, which is conducive to the transport under the influence of the air flow. It is also possible to form the envelope with a folded-back portion on both sides, so that the envelope is in the form of an arrow, seen in side elevation. The transport of the envelope can take place with the arrow pointing forwards or backwards.

Furthermore it is possible to construct the enveloping device 6 so that a longitudinal strip is formed on one long side or one both long sides of the rectangular envelope, which strip projects with respect to the banknotes. Such a longitudinal strip enlarges the surface area of the envelope.

The method disclosed herein for conveying sheet-like objects by means of the system disclosed herein has the advantage that there is no need to use cartridges. This enables the use of relatively simple apparatus and eliminates the need to return empty cartridges. The transport of the banknotes through the conveying channels 5 can take place at a higher velocity than in a system which employs cartridges.

The control unit 4 may include detectors 9, 10 (schematically indicated), which monitor the in-feed and the delivery at, respectively, the inlet side and the outlet side of each conveying channel 5. This enables immediate detection of possible fraud, and also of any malfunctions.

Figure 2A:
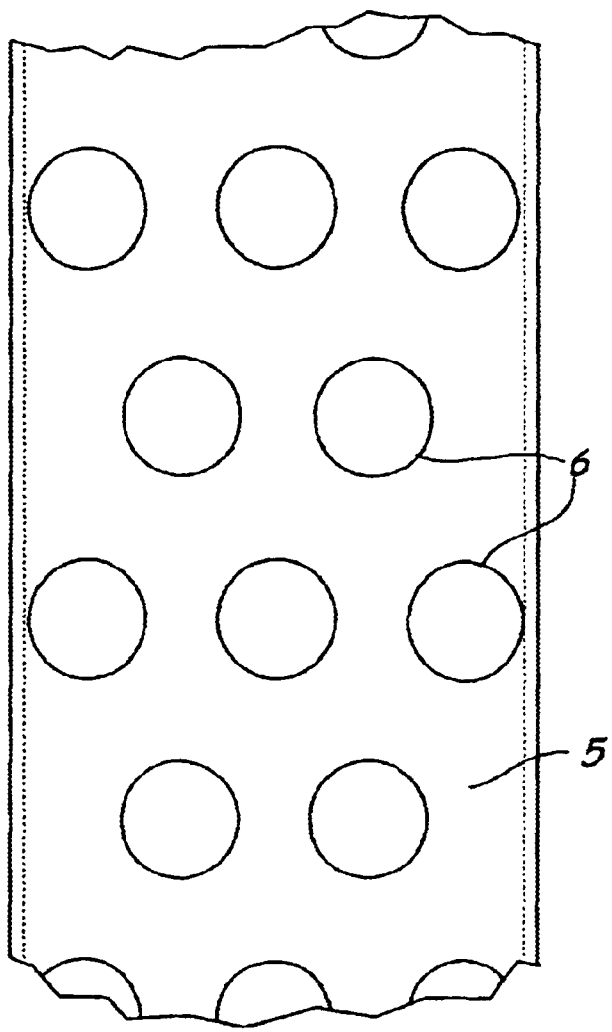
FIGS. 2A, 2B, 2C, 3A, 3B, 3C, 4A, 4B and 4C illustrate various embodiments of conveyance channels in a top plan view of the inner wall, in a longitudinal sectional view and in a cross-sectional view.
Figure 2B:
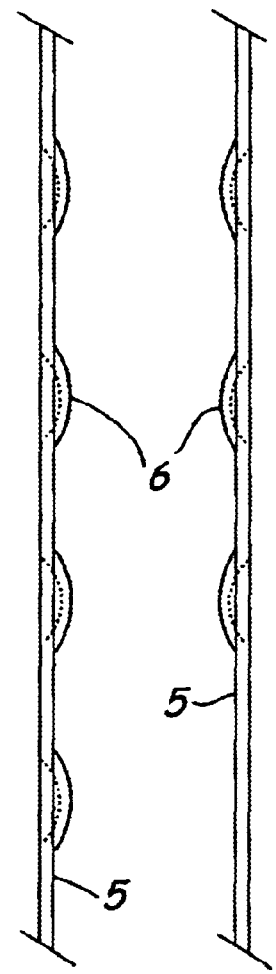
Figure 2C:
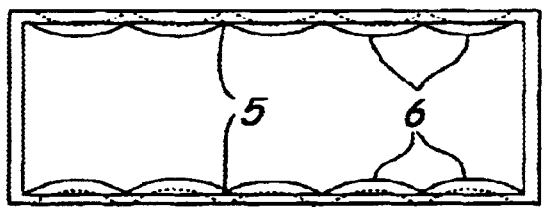

FIGS. 2A–2C show the conveyance channel 5 in a top plan view of an inner wall, in a longitudinal sectional view and in a cross-sectional view. As appears from FIG. 2C, the conveyance channel 5 is of substantially rectangular cross-section, wherein the opposed inner walls 11 having the larger dimension are provided with means which influence the air flow generated in conveyance channel 1 in such a manner near the inner walls that an air flow directed away from the inner wall 11 in question is generated near each of said inner walls 11. In the embodiment according to FIGS. 2A–2C, said means are in the form of elements 12 projecting from inner wall 11, which elements 12 are slightly spherical in this embodiment. Said spherical elements 12 disturb the air flow along inner walls 11, so that swirls are produced at the location of the elements 12, which result in an air flow near the inner walls 11 which is in effect directed away from the respective inner wall 11. As a result, the envelope cannot stick to inner wall 11.

In the embodiment as shown in FIG. 2, elements 12 are arranged in such a pattern that the elements 12 are mutually staggered in successive rows in the longitudinal direction of the conveyance channel 5. In this embodiment, the spacing between elements 12 in longitudinal direction more or less equals the diameter of an element 12 in the plane of inner wall 11. The spacing between elements 12 in transverse direction is such that the elements 12 of the successive rows are partially in line, so that each line extending in longitudinal direction intersects an element 12 of each row.

In the embodiment of FIGS. 2A–2C, the elements 12 furthermore project from the associated inner wall 11 to a height of about 2 mm. The height of the channel 5 is about 30 mm in this embodiment. Other heights of projection of the elements 12 from inner wall 11 are also possible. Said height may for example vary from 2–10% of the height of the conveyance channel 5. The width of conveyance channel 5 is preferably greater than the greatest width of the sheet-like objects to be conveyed.

Figure 3A:
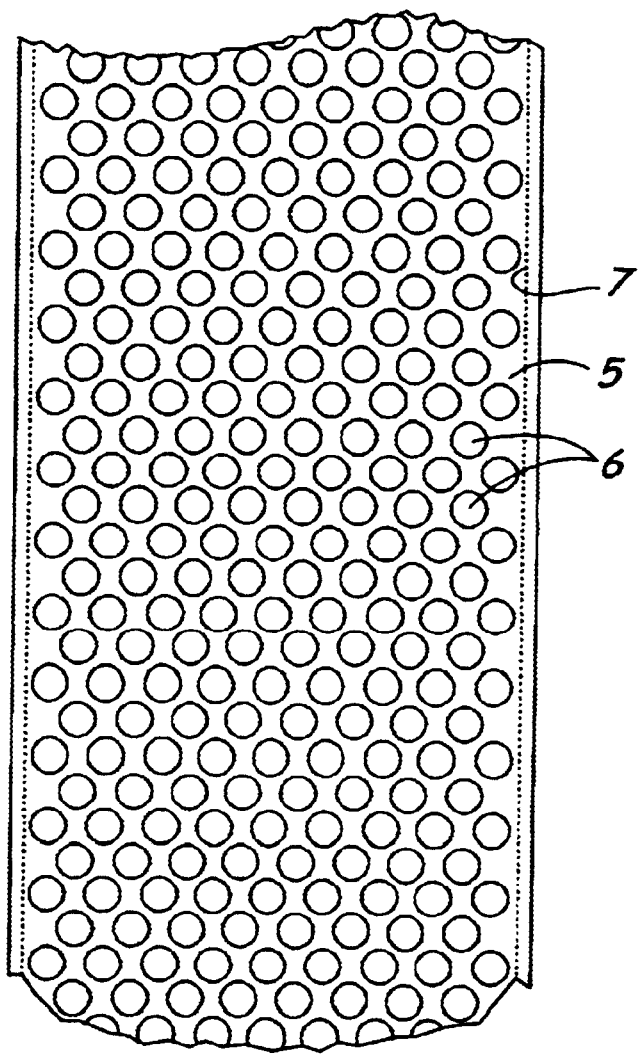
Figure 3B:
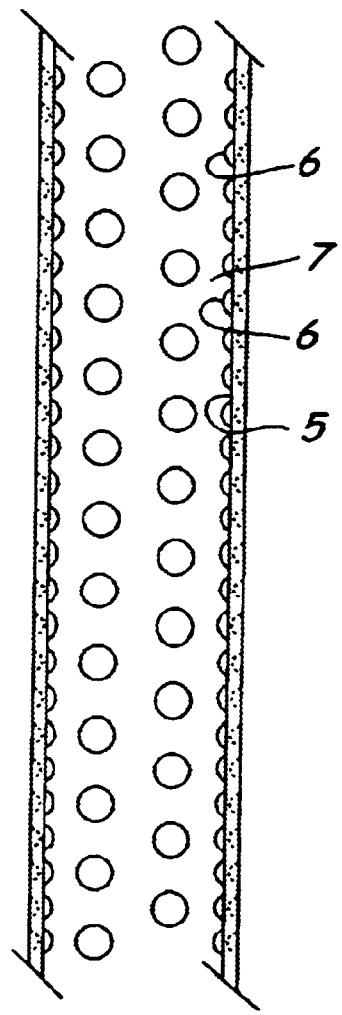
Figure 3C:
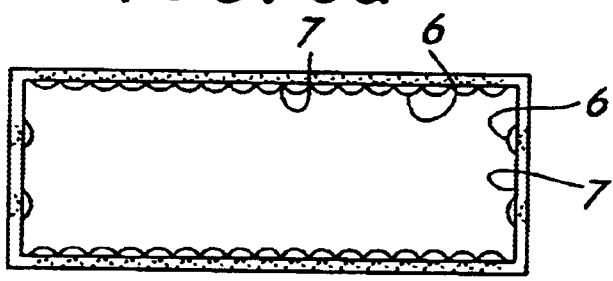
Figure 4A:
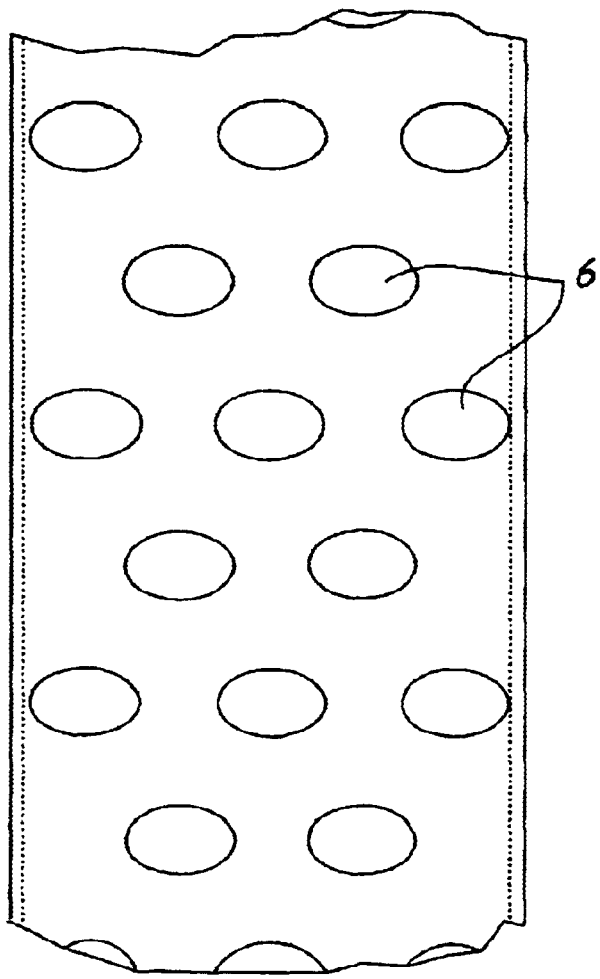
Figure 4B:
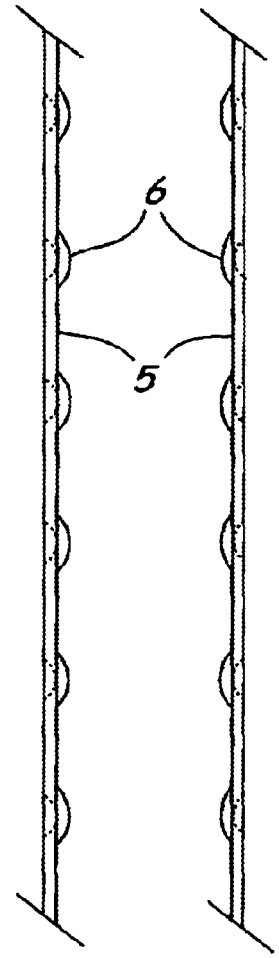
Figure 4C:
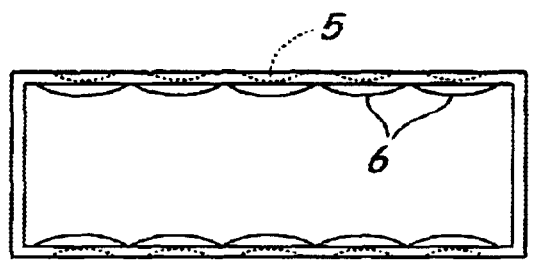

As is shown in FIGS. 3A–3C, it is possible to use elements 12 having a smaller diameter, and the elements may be arranged with a smaller spacing between them, independently of their diameter, while also the two other opposed inner walls 13 may be formed with the same elements 12 or with differently formed elements 12. As is shown in FIGS. 4A–4C, elements 12 may also have different shapes. According to FIGS. 4A–4C, the elements 12 are slightly elliptical, seen in top plan view.

Although elements 12 of the above-described variants of the conveyance channel 5 have a uniformly increasing or decreasing height, seen in the longitudinal direction of the channel 5, the elements 12 may also be designed to exhibit steeper inclinations on their upstream or their downstream side, if desired.

Figure 5A:
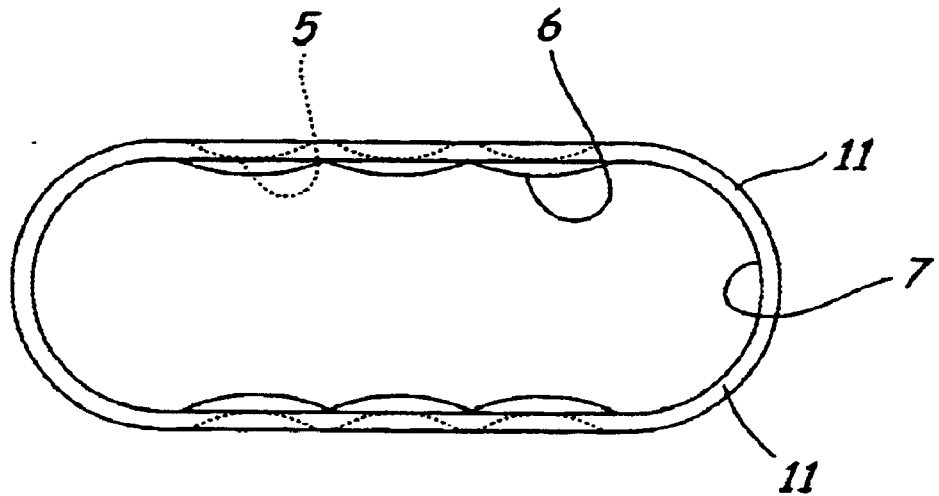
FIGS. 5A and 5B are cross-sectional views of alternative embodiments of the conveyance channel.
Figure 5B:
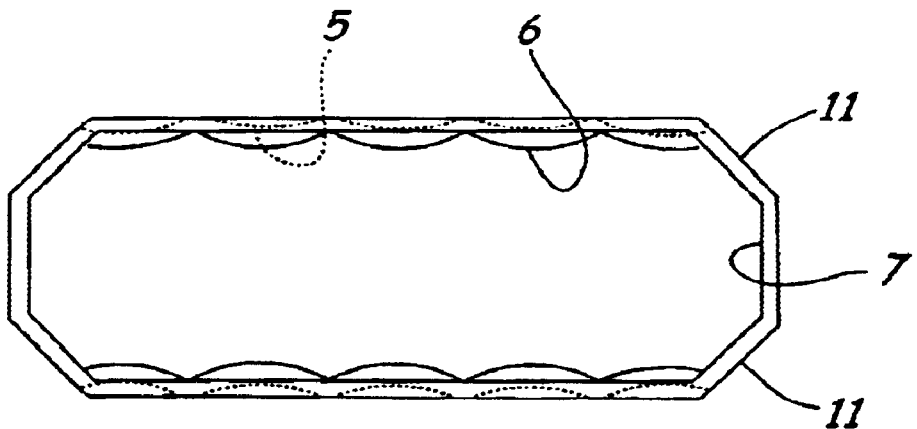

FIG. 5A is another cross-sectional view of an embodiment, wherein transitions 14 between side walls 11 and 13 are non-square transitions. In the illustrated embodiment, said transitions 14 are in the form of a radius, such that the short side walls are substantially semicircular, seen in sectional view. It is also possible, however, to use other non-square transitions, for example straight transitions which include an angle of for example 45° with both inner walls, as is illustrated in FIG. 5B.

The invention is not restricted to the above-described embodiments, which can be varied in several ways without departing from the scope of the claims.

What is claimed is:

1. A system for conveying banknotes in an envelope comprising:
    a cash dispensing unit;
    at least one cash dispensing station;
    a selecting unit;
    a control unit;
    at least one conveying channel having an inlet side and an outlet side being disposed between said cash dispensing unit and the at least one cash dispensing station, wherein each of the at least one conveying channel has its outlet side at an associated cash dispensing station;
    a pump fluidly coupled to each of the at least one conveying channel and adapted to generate air flow in the at least one conveying channel; and
    an enveloping device adapted to envelope the banknotes to be conveyed, the enveloping device disposed between the cash dispensing unit and the at least one conveying channel,
    wherein the cash dispensing unit is adapted to deliver banknotes requested by the at least one cash dispensing station to the enveloping device under the control of said control unit, wherein the enveloping device is adapted to envelop banknotes requested by the requesting cash dispensing station and then deliver the requested enveloped banknotes to the selecting unit, and wherein the selecting unit is disposed between the enveloping device and the inlet side of the at least one conveying channel and adapted to deliver the requested enveloped banknotes to the one of the at least one conveying channel connected to the requesting cash dispensing station.

2. The system according to claim 1, wherein the selecting unit is adapted to deliver the enveloped banknotes to the conveying channel associated with the requesting cash dispensing station.

3. The system according to claim 2, wherein at least one dispensing station comprises an automatic cash dispensing machine.

4. The system according to claim 1, wherein the enveloping device is adapted to form a folded-back portion at one end of the envelope being formed.

5. The system according to claim 4, wherein the enveloping device is adapted to form a folded-back portion on two sides of the envelope being formed.

6. The system according to claim 1, wherein the at least one conveying channel has a substantially rectangular cross-section, wherein the opposing inner walls having the larger dimension comprise a plurality of projections which influence air flow generated in the conveying channel near inner walls in such a manner that an air flow away from the inner wall in question is produced near each of said inner walls.

7. A method for conveying banknotes, the method comprising the steps of requesting banknotes from a requesting cash dispensing unit by at least one cash dispensing station, conveying the requested banknotes from the cash dispensing unit to an enveloping device, enveloping the requested banknotes in the enveloping device, an envelope formed for each request of banknotes, conveying the requested enveloped banknotes from the enveloping device to a selecting unit, conveying the requested enveloped banknotes from the selecting unit to an inlet end of a conveying channel, and conveying the enveloped banknotes through the conveying channel to the requesting cash dispensing station by means of an air flow.

8. The method according to claim 7, wherein the step of enveloping further comprises folding a folded-back portion at one end of the envelope being formed, at least on one side thereof.

9. The method according to claim 7, wherein the step of enveloping further comprises applying a longitudinal strip on the envelope being formed.

10. The method of conveying banknotes of claim 7, wherein conveying the requested enveloped banknotes from the selecting unit further comprises selecting an inlet end of the conveying channel associated with the requesting cash dispensing station.

\* \* \* \* \*